Jan. 26, 1932.  J. H. HUNT  1,842,831

SHOCK ABSORBER

Filed Nov. 23, 1929

Inventor

John H. Hunt

By Spencer, Hardman and Icho

Attorneys

Patented Jan. 26, 1932

1,842,831

UNITED STATES PATENT OFFICE

JOHN H. HUNT, OF DETROIT, MICHIGAN, ASSIGNOR TO DELCO PRODUCTS CORPORATION, OF DAYTON, OHIO, A CORPORATION OF DELAWARE

SHOCK ABSORBER

Application filed November 23, 1929. Serial No. 409,264.

This invention relates to improvements in hydraulic shock absorbers.

It is among the objects of the present invention to provide an hydraulic shock absorber adapted to control both the compression and rebound movements of vehicle springs.

Another object of the present invention is to provide a shock absorber in which all of the fluid control devices are carried by the fluid displacement member.

Further objects and advantages of the present invention will be apparent from the following description, reference being had to the accompanying drawings, wherein a preferred embodiment of one form of the present invention is clearly shown.

Figure 1:
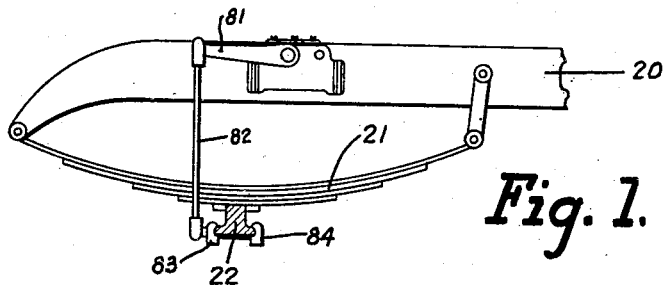
Fig. 1 is a fragmentary side view of a vehicle chassis, having a shock absorber embodying the present invention attached thereto.

Referring to the drawings, the numeral 20 designates the frame of the vehicle having vehicle springs 21 hingedly secured thereto, which springs support the frame upon the vehicle axle 22.

The shock absorber comprises a casing 23 presenting a fluid reservoir 24 and a cylinder 25. The fluid reservoir has an opening 26 which is closed and sealed by a cover 27 provided with a gasket 28 and secured to the casing 23 by screws 29. The open ends of the cylinder portion of the casing 23 are each provided with interior screw threads adapted to receive the end cover members 30 and 31 respectively.

Within the cylinder portion 25 of the casing there is provided a fluid displacement member 40 forming a compression chamber at each end of the cylinder. One compression chamber is designated by the numeral 41, the other by the numeral 42. In each end of the piston 40 there is provided a valve chamber, one being designated by the numeral 43, the other by the numeral 44. The outer ends of these valve chambers terminate in the respective end surfaces of the piston 40 so that valve chamber 43 may be said to open into the compression chamber 41, while valve chamber 44 opens into the compression chamber 42. The outer end of each valve chamber 43 and 44 respectively is provided with screw threads for receiving a ring-shaped valve-seat member, the one for the valve chamber 43 being designated by the numeral 45, and the valve seat for the valve chamber 44 by the numeral 46. A valve 47 is contained within the valve chamber 43 and a similar valve 48 in the valve chamber 44. Valve 47 is maintained against its seat member 45 by a spring 49 interposed between said valve 47 and the closed end of the valve chamber 43. A similar spring 50, within the valve chamber 44, yieldably maintains valve 48 in engagement with its valve seat member 46. A duct 51 has its one end terminating in the valve chamber 43, the other in the opposite end surface of the piston which forms one wall of the compression chamber 42. A similar duct 52 terminates at one end in the valve chamber 44, the other end in the opposite end of the piston which forms one wall of the compression chamber 41. Both ducts 51 and 52 are normally closed at their respective valve chamber ends by the respective valves 47 and 48.

The valves just described form the compression release valves of the shock absorber and are adapted, at proper fluid pressures within their respective compression chambers, to provide a restricted flow of fluid from said respective compression chambers to the compression chamber at the opposite end of the cylinder, thus, compression chamber 41 may discharge past the valve 47 through duct 51 into the compression chamber 42 in response to a proper fluid pressure within the compression chamber 41, while compression chamber 42 may at a proper pressure discharge through duct 52 into the compression chamber 41.

Fluid leaking past the pistons, or from any other supposedly sealed portion of the shock absorber, would gradually deplete the supply of fluid within the compression chambers 41 and 42 so that eventually effective operation of the shock absorber would be materially affected. In order to compensate for such fluid leaks, each end of the piston 40 is provided with a fluid replenishing valve. The piston has a recess 59 intermediate the ends thereof which receives piston operating arm 60 and which is at all times in communication with the fluid reservoir 24. A duct or passage 61 in the piston 40 provides communication between the recess 59 and the compression chamber 42, while a similar duct 62 provides communication between the compression chamber 41 and said intermediate recess 59. Each passage 61 and 62 has an enlarged portion adjacent its respective piston end forming a valve chamber, the valve chamber opening into the compression chamber 42 being designated by the numeral 63, the chamber opening into compression chamber 41 being designated by the numeral 64. A tapered shoulder 65 is provided in the duct 61, while a similar tapered shoulder 66 is provided in the duct 62. These tapered shoulders form valve seats for the respective ball check valves 67 and 68. Ball check valves 67 and 68 are maintained in yieldable engagement with their respective valve seats by springs 69 and 70 respectively.

The piston operating arm 60 is anchored upon a shaft 80 which is journalled within bearings provided by the casing 23, said shaft having one end extending outside the casing and being provided with the shock absorber operating arm 81, the free end of which is swivelly secured to one end of the link rod 82. The opposite end of the link rod 82 is secured to a member 83 which is anchored to the axle 22 by the clamping member 84.

Figure 2:
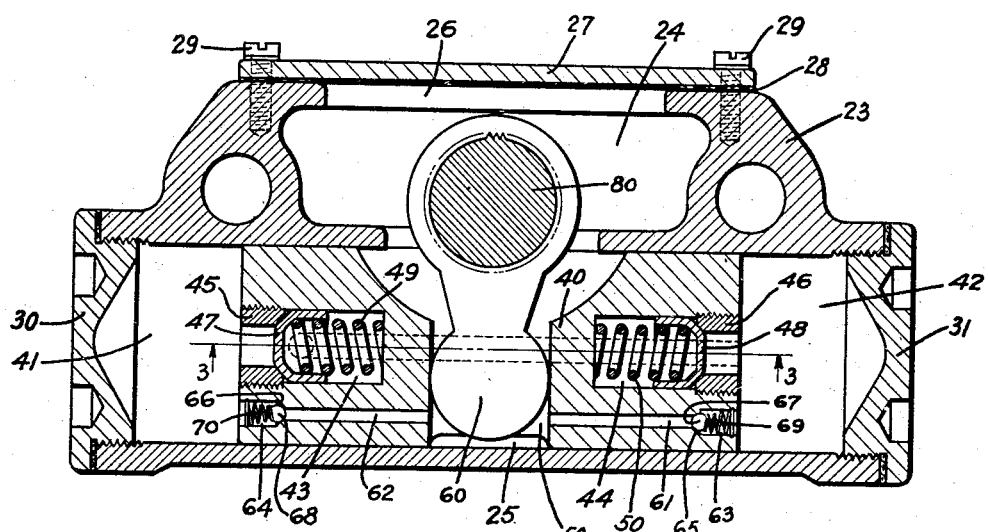
Fig. 2 is a longitudinal sectional view taken through the center of the shock absorber.
Figure 3:
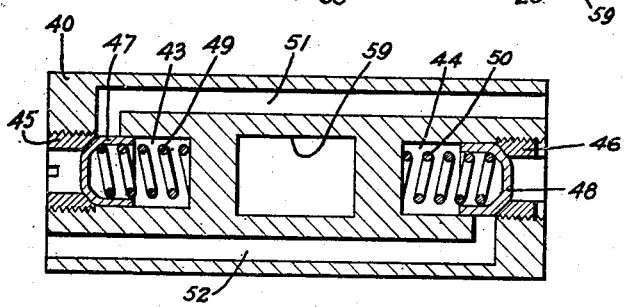
Fig. 3 is a sectional view of the fluid displacement member taken substantially along the line 3—3 of Fig. 2, the operating member therefor being omitted for the sake of clearness.
Figure 4:
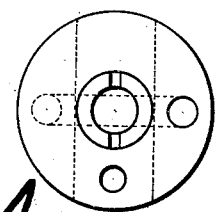
Fig. 4 is an end view of the fluid displacement member.

The device functions in the following manner:

When the wheels (not shown) strike an obstruction in the roadway, springs 21 are flexed toward the frame 20, resulting in a clockwise movement of the arm 81 by the link rod 82. Arm 81 rotating clockwise will cause a similar rotating movement of the shaft 80 and its attached piston operating arm 60 so that, as the springs 21 move toward the frame 20, the piston 40 will be moved toward the left as regards Fig. 2 and consequently, if compression chamber 42 needs its fluid supply to be replenished, fluid will flow from the reservoir 24 into the intermediate recess 59 of the piston and then through the duct 61 past the valve 67 through the valve chamber 63 into the compression chamber 42. Movement of the piston 40 toward the left will exert pressure upon the fluid within the compression chamber 41 which, if attaining a proper value, will move the valve 47 from the valve seat 45, against the effect of its spring 49 and will thus establish a restricted flow of fluid from the chamber 41 through the valve seat member 45 past the valve 47 through duct 51, exhausting into the compression chamber 42. The restriction to the flow of fluid from the compression chamber 41 by valve 47, will resist the movement of the piston 40 toward the left so that the movement of the springs 21 toward the frame will likewise be resisted.

As soon as the springs 21 have reached the limit of their flexure caused by the particular obstruction, the tendency of said springs is to return to normal, unflexed position with a sudden, rebounding movement which, if not controlled or checked, will result in undesirable jars and jolts being transmitted to the frame of the vehicle. The present device retards the movement of the spring toward the normal, unflexed position for, as the springs begin to move away from the frame 20, the link rod 82 will move the shock absorber operating arm 81 in a counter-clockwise rotation, resulting in a similar rotation of the shaft 80 and arm 60 and thus a clockwise movement of the piston 40 toward the right. Now the replenishing valve 68 may become effective to compensate for fluid losses if there are any in the chamber 41. Movement of the piston 40 toward the right will cause the fluid within the chamber 42 to move the valve 48 from its seat as soon as the fluid pressure in the compression chamber 42 reaches a predetermined value, at which time a restricted flow is established from the fluid chamber 42 past the valve 48 through duct 52 into the compression chamber 41. The restriction by the valve 48 to the flow of fluid from the chamber 42 will resist the movement of the piston 40 toward the right and thus will be resisted the movement of the springs 21 toward their normal unflexed position whereby rebounding movements of the spring are substantially eliminated and thus the resulting jars and jolts are substantially avoided.

The present invention provides a device of simple structure and design and inasmuch as all fluid flow controlled valves are carried by the piston, it may readily be seen that the piston assembly may be completely tested and checked before it is finally assembled into the shock absorber, thus facilitating production of an efficient operating shock absorber with a minimum expenditure of time.

While the form of embodiment of the present invention, as herein disclosed, constitutes a preferred form, it is to be understood that other forms might be adopted, all coming within the scope of the claims which follow.

What is claimed is as follows:

1. A shock absorber comprising, in combination, a casing presenting a fluid reservoir and a cylinder; a piston in said cylinder forming a compression chamber at each end thereof; means for reciprocating said piston; valved ducts in the piston adapted to establish communication between the compression chambers in response to predetermined fluid pressures within the respective chambers; and valved ducts in the piston adapted to establish communication between the respective compression chambers and the fluid reservoir to replenish the fluid supply in said chambers.

2. A shock absorber comprising, in combination, a casing presenting a fluid reservoir and a cylinder; a piston in said cylinder forming a compression chamber at each end thereof; means for reciprocating said piston; two valve chambers at each end of the piston; a duct connecting the one valve chamber at each end of the piston with the compression chamber at the opposite end of the piston; a duct connecting each other valve chamber at each end of the piston with the fluid reservoir; a spring-loaded valve in the one valve chamber at each end of the piston, adapted to establish a restricted flow of fluid from the respective compression chamber at that end of the piston, through its duct, to the chamber at the other end of the piston, as the piston moves toward the end of the cylinder adjacent the respective valve and as a proper fluid pressure is attained; and a spring-loaded valve in the other valve chamber at each end of the piston, adapted in response to the movement of the piston away from the end of the cylinder adjacent the respective valve, to establish a replenishing flow of fluid from the fluid reservoir into the respective compression chamber with which said valve communicates.

3. A shock absorber comprising, in combination, a casing presenting a fluid reservoir and a cylinder; a piston in said cylinder forming a compression chamber at each end thereof; means for reciprocating said piston; a pressure release and an intake chamber at each end of the piston, each pressure release chamber communicating separately with both compression chamers and each intake chamber with a respective compression chamber and the fluid reservoir; a valve in each pressure release chamber adapted to establish a restricted flow of fluid through said chamber only in response to a proper fluid pressure in its respective compression chamber; and a valve in each intake chamber adapted to establish a replenishing fluid flow from the fluid reservoir into the respective compression chambers as the piston moves to increase the cubical contents of said chambers.

In testimony whereof I hereto affix my signature.

JOHN H. HUNT.